United States Patent

[11] 3,589,596

[72] Inventors Frank O'Conor
Moline;
John W. Sherlock, East Moline, both of, Ill.
[21] Appl. No. 846,067
[22] Filed July 30, 1969
[45] Patented June 29, 1971
[73] Assignee Ametek, Inc.
New York, N.Y.

[54] PLOW STEPPING ARRANGEMENT
10 Claims, 10 Drawing Figs.
[52] U.S. Cl. .................................................. 233/3
[51] Int. Cl. .................................................. B04b 1/00,
B04b 3/00
[50] Field of Search ........................................ 223/3, 1,
12, 16—18, 2, 20

[56] References Cited
UNITED STATES PATENTS
1,050,622  1/1913  Raasloof et al. .............. 233/1 D Primary Examiner—Jordan Franklin
Assistant Examiner—George H. Krizmanich
Attorney—Smythe and Moore ABSTRACT: A centrifugal separator is provided with an unloader comprising a plow vertically within the rotary separator drum or basket and horizontally movable toward and away from the inner wall surface of the drum. After each downstroke of the plow a stepped cam is advanced one step and provides an adjustable stop member for limiting the horizontal movement of the plow. The plow is thus progressively moved inwardly toward the inner wall surface of the drum. The stepped cam is driven through a flexible drive shaft connected to a pinion advanced stepwise during each retraction of the plow after a downstroke.

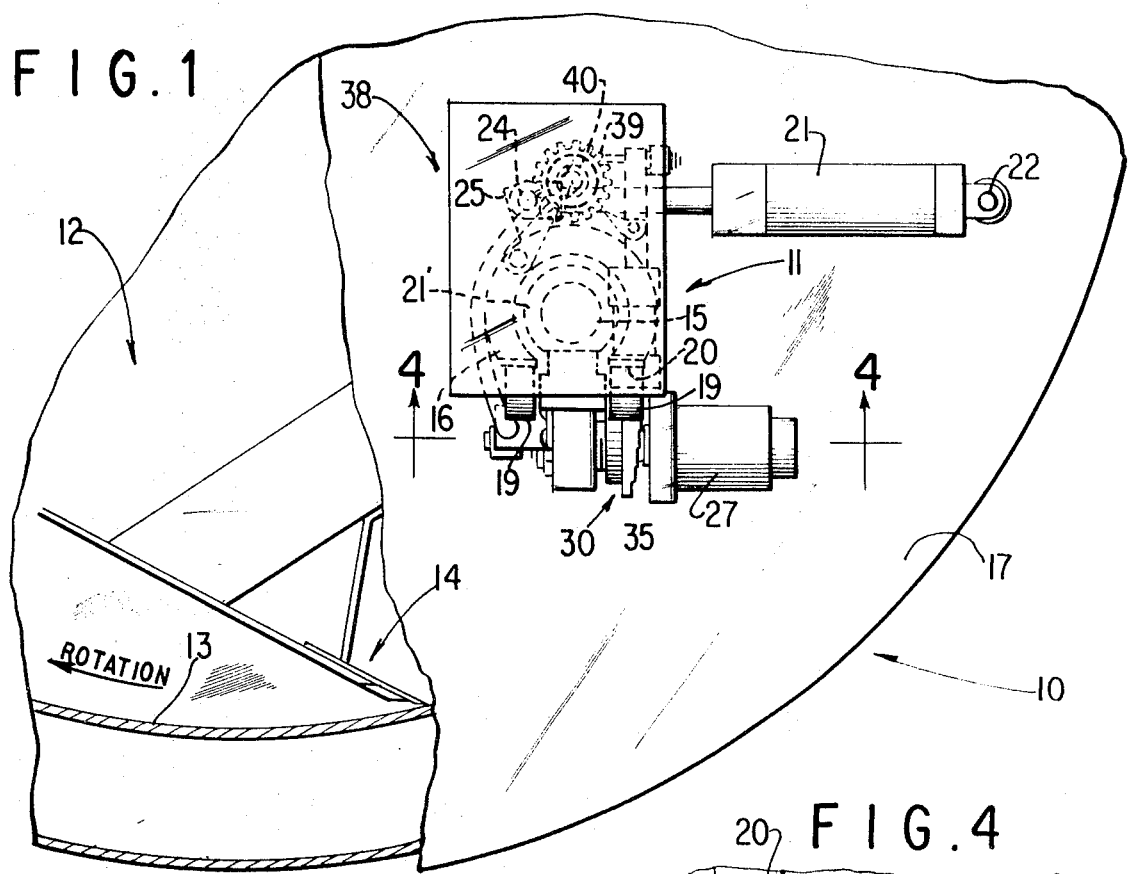
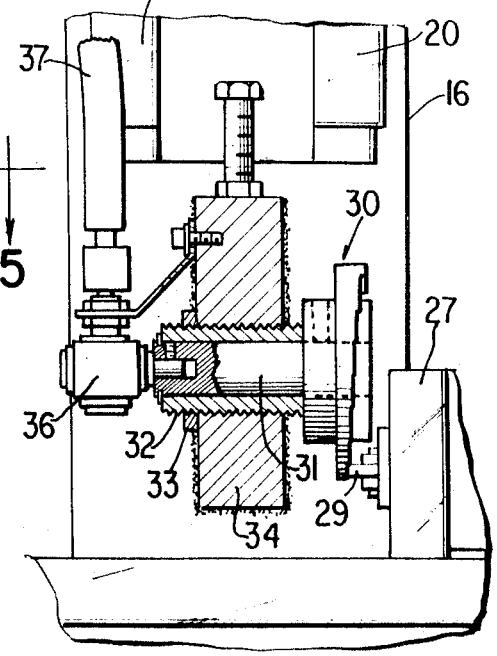
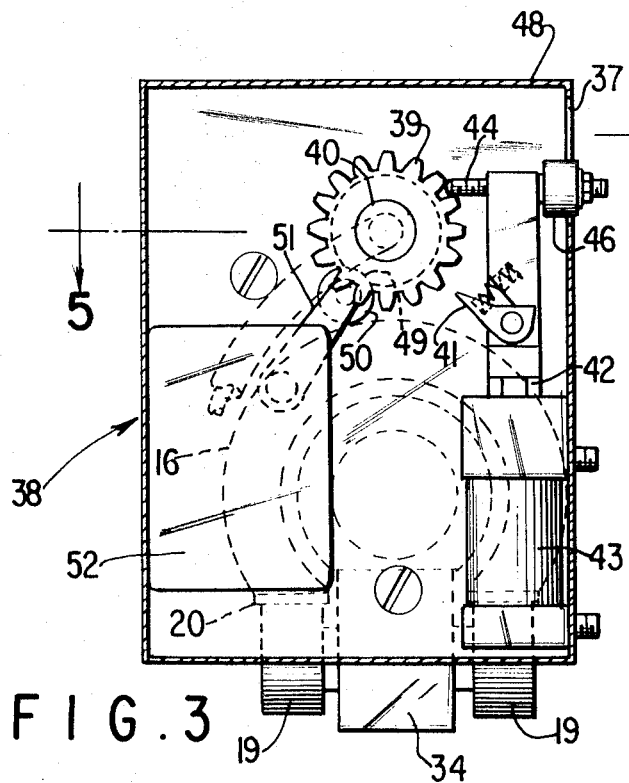

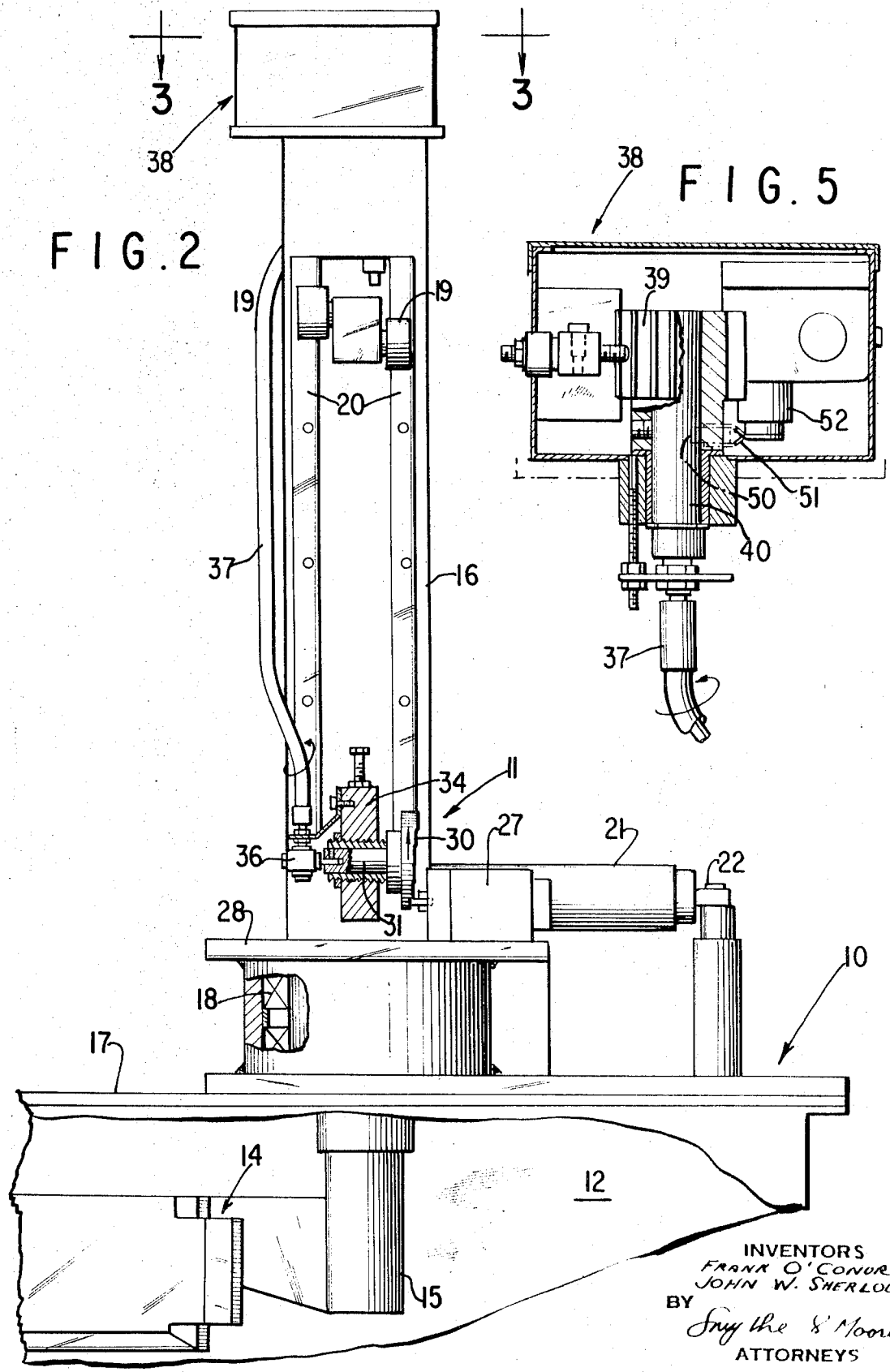

FIG. 6
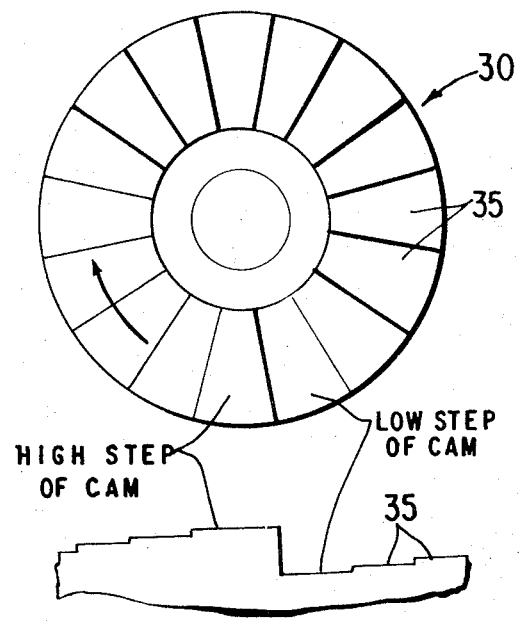
HIGH STEP OF CAM — LOW STEP OF CAM
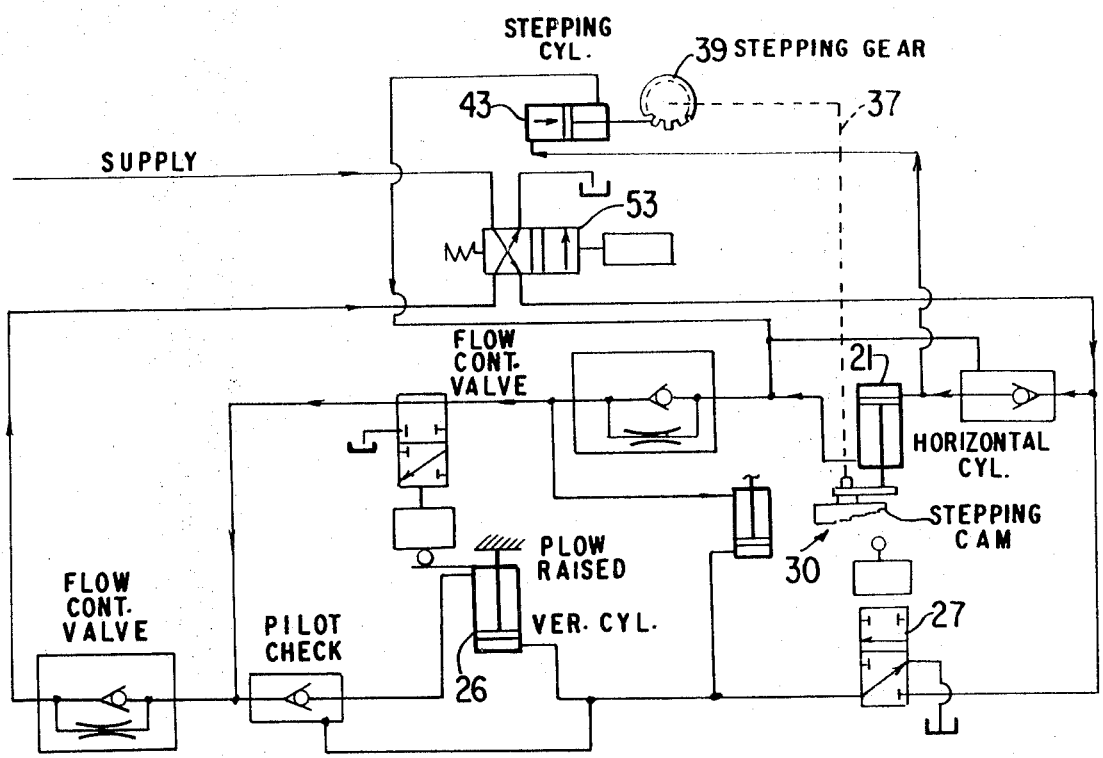
SEQUENCE 1— PLOW ROTATING TOWARDS BASKET SIDE SHEET.
FIG. 7

SEQUENCE 2— POSITION OF UNLOADER PLOW BEING LOWERED

SEQUENCE 3—POSITION OF UNLOADER PLOW BEING RAISED

SEQUENCE 4— POSITION OF UNLOADER PLOW ROTATING TOWARDS BASKET HUB AND AWAY FROM BASKET SIDE SHEET

PLOW STEPPING ARRANGEMENT

During a centrifuging THE as carried out in the rotary separator drum of a centrifugal separator, solids in the form of a filter cake will accumulate on the inner wall surface of the rotating drum. The removal of this accumulated filter cake is carried out by an unloader assembly which generally comprises a plow mounted on suitable apparatus for vertical movement in a direction generally parallel to the inner wall surface and horizontal movement generally radially with respect to this surface. In order to remove the filter cake, the plow is adjusted radially at a predetermined distance from the wall surface and the moved vertically downwardly while the separator drum rotates. At the end of the downward stroke the plow may either be retracted or moved vertically upwardly to remove solids on the upward vertical stroke. With such an arrangement a uniform thickness of solids remains on the inner wall surface since the distance of the plow from the wall surface remains uniform.

With filter cakes of certain materials it is desirable to take successive depths of cut with the unloading plow. Some materials have a tendency to become glazed as the plow moves over the surface and consequently become blinded to result in subsequent slow drainage. By taking a deeper cut on each successive load from the accumulated solids, a fresh solid surface is available for each new load to drain through. In some cases it is desirable to precoat the filter media with a filteraid and by means of a stepping arrangement remove successive layers of filteraid. In either event, it is desirable to indicate when the maximum depth of cut has been reached so that other necessary operations can be performed.

One of the objects of the present invention is to provide an improved plow stepping arrangement for the unloader assembly of a centrifugal separator.

Another of the objects of the present invention is to provide an unloader where in the plow is moved progressively closer to the surface of the separator drum so that successive depths of cut of the accumulated solids are obtained during the unloading operation.

In one aspect of the present invention, an unloader assembly is provided for a centrifugal separator which may comprise a plow engageable with solids accumulated on the inner wall surface of a rotary separator drum in the centrifuge. Means are provided to move the plow vertically downwardly during the unloading operation and retracting the plow after an unloading operation has been completed. In addition, the plow can be moved horizontally toward and away from the separator drum inner wall surface. In response to the rotary movement of the plow means are provided for actuating the horizontal moving means so as to move the plow stepwise toward the inner wall surface at the beginning of each unloading operation.

The means for actuating the horizontal moving means may comprise a stepped cam assembly with the cam being progressively rotated with each retraction of the plow.

Other objects, advantages and features of the present invention will be apparent from the accompanying description and drawings, which are merely exemplary. In the drawings:

FIG. 1 is a top plan view of the unloader assembly according to the present invention and showing the plow within the separator drum;

FIG. 2 is an elevational view of the unloader assembly shown in FIG. 1;

FIG. 3 is a sectional view taken along the line 3-3 of FIG. 2;

FIG. 4 is a sectional view taken along the line 5-5 of FIG.

FIG. 6 shows both the plan and elevation in enlarged scale of the stepping cam used in the present invention; and FIGS. 7, 8, 9 and 10 are schematic diagrams showing the hydraulic unloader circuit of the unloader assembly of the present invention under various conditions.

Proceeding next to the drawings wherein like reference symbols indicate the same parts throughout the various views a specific embodiment of the present invention will be described in detail.

Figure 8:
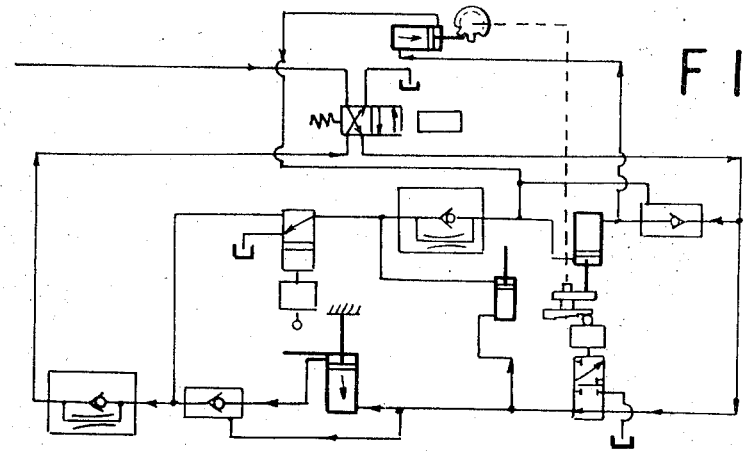

In FIGS. 1 and 2 there is indicated at 10 a centrifugal separator in which the unloader assembly indicated generally at 11 is incorporated. The separator comprises a rotary separator drum 12 having an inner wall surface 13. Within the drum there is an unloader plow 14 mounted on shaft 15 for both vertical and horizontal movement. During the unloading operation, drum 12 is rotated at a low speed.

The shaft 15 is carried within a vertical column 16 which is rotatably mounted on the upper surface 17 of the stationary case and journaled at 18. The shaft 15 has rollers 19 which move against guide rails 20 on the column to retain the shaft 15 against rotation relative to column 16.

The column 16 is rotated about its vertical axis and thus to move the plow radially with respect to the drum by means of a horizontal hydraulic cylinder 21 pivotally mounted at 22 and having a rod 23 pivotally connected at 24 to an arm 25 extending radially from the lower end of the column 16.

The vertical movement of shaft 15 and thus of the plow 14 is controlled by a vertical hydraulic cylinder 26 which may be seen in the schematic diagram of FIG. 7.

The operation of hydraulic motor 21 is controlled by a four-way hydraulic valve 53 which can be manually or electrically actuated. The shifting of valve 53 actuates hydraulic motor 21 to rotate the plow 14 in a counterclockwise direction towards the basket side sheet. Radial movement of the plow 14 with respect to the inner surface of the rotary drum is limited by a stepped cam arrangement.

Valve 27 is provided with an actuator 29 engageable by a stepped cam 30 mounted on a shaft 31 journaled within a threaded bushing 32 positioned within a threaded bore 33 of a lug 34 mounted on the column 16. The stepping cam 30 is illustrated in greater detail in FIG. 6 and comprises a plurality of radially extending cam surfaces 35 having progressive heights as may be seen in the lower portion of FIG. 6.

The shaft 31 is driven through a bevelled gear arrangement in an enclosure 36 by a flexible shaft 37 extending to the upper assembly indicated at 38 of the unloader arrangement.

The upper assembly comprises a pinion 39 mounted on shaft 40 which is fixedly connected to the flexible cable 37.

Figure 9:
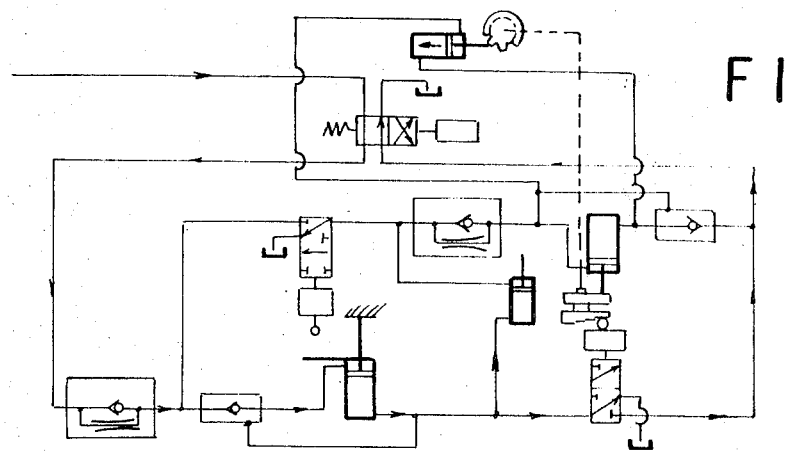
Figure 10:
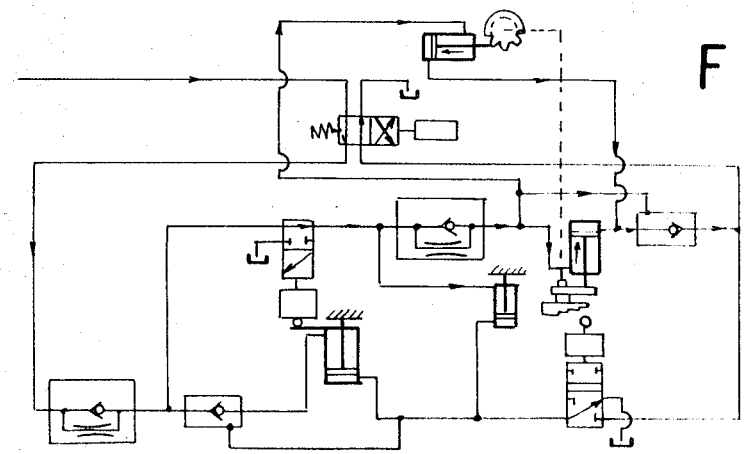

The pinion 39 is advanced one tooth or more at a time by means of a spring loaded pawl 41 on the end of a rod 42 extending from a hydraulic cylinder 43. The hydraulic cylinder 43 is actuated when the plow begins to rotate towards the basket side sheet and extends the rod 42 so that the pawl 41 engages teeth of pinion 39 to index the pinion. The cylinder rod 42, pawl 41 and pinion 39 stay in this position until the unloading operation has been completed and the plow is being rotated away from the basket side sheet. At this time hydraulic pressure to the hydraulic cylinder 43 is reversed to retract the piston rod 42 and pawl 41. Hydraulic flow patterns during the different sequences of the unloading operation are shown in FIGS. 7, 8, 9 and 10.

To retain the pinion in its indexed position when the spring loaded pawl 41 is retracted there is provided an extended setscrew 44 carried in a bracket 45 and on the lower end of the setscrew is a cam roller 46 which slides within a slot 47 within housing 48 to prevent rotation of the piston and pawl assembly.

Pinion hub 39 is provided with a depression 49 for receiving a cam roller 50 on the end of an arm 51 to actuate a limit switch indicated at 52. The depression 49 is so positioned that the limit switch is actuated when the plow has reached its maximum depth of cut. The limit switch will thus provide a signal to warn the operator that the maximum depth has been reached. If a precoat is being used during the unloading operation this signal could interrupt an automatic cycle to introduce a new layer of filteraid precoat before the automatic cycle could resume.

When the stepping cam 30 is in the position as shown in FIG. 4 maximum travel of the plow toward the basket inner wall 13 is accomplished. The entire cam assembly can be adjusted by means of the threaded bushing 32 and the lock nut 33 so that the necessary adjustment can be made to prevent the plow from catching the cloth or wire filter media lining the inner surface of the separator drum or basket.

In operation, the high step of the stepping cam 30 as shown in FIG. 6 will first strike the actuator 29 of the hydraulic valve 27. The stepping cam functions as a travelling stop to determine the depth of the cut. With each successive unloading operation for downward stroke of the plow the stepping cam 30 is indexed one cam stop to allow successive depths of the cut to be made. Each cut is about one-sixteenth of an inch deeper than the previous cut.

The stepping movement of the cam 30 is carried out in conjunction with the indexing of the pinion 39. Indexing movement of the pinion 39 is transmitted to the stepping cam through the flexible drive shaft 37.

When the pinion 39 has made one complete revolution which point represents the maximum depth of cut the cam roller 50 will become seated in the depression 49 and will actuate the limit switch 52 to give a suitable signal.

Thus it can be seen that the present invention has disclosed a plow stepping arrangement for the unloader assembly of a centrifuge separator. Cuts of successively increasing depth can be made up to a maximum depth which has been previously set by suitable adjustment of the cam stepping assembly.

It will be understood that various details of construction and arrangement of parts may be made without departing from the spirit of the invention.

What we claim is:

1. In an unloader assembly for a centrifugal separator, the combination of a plow engageable with solids accumulated on the inner wall surface of a rotary separator drum in a centrifuge, means for moving the plow vertically downwardly during the unloading operation and retracting the plow after an unloading operation, means for moving the plow horizontally toward and away from the separator drum inner wall surface, and means responsive to the vertical movement of said plow for actuating said horizontal moving means to move said plow stepwise toward said inner wall surface after an unloading operation.

2. In an unloader assembly as claimed in claim 1 with said horizontal moving means comprising a hydraulic motor, a control valve for said hydraulic motor, said actuating means comprising an adjustable stop member to limit selectively the operation of the control valve and the stroke of said hydraulic motor.

3. In an unloader assembly as claimed in claim 2 with said stop member comprising a stepped cam, and means responsive to the end of the downstroke of the plow and operatively connected to said stepped cam for adjusting the position of the cam with respect to said control valve.

4. In an unloader assembly as claimed in claim 3 with said stepped cam being rotatable and having a series of cam surfaces thereon engageable with said control valve.

5. In an unloader assembly as claimed in claim 4 and comprising a lug having a threaded bore mounted on the separator, a threaded bushing within said lug threaded bore, a shaft rotatably mounted within said bushing, said stepped cam being mounted on said shaft.

6. In an unloader assembly as claimed in claim 5 and comprising means on said bushing for lockingly engaging said bushing with respect to said lug to adjust said stepped cam with respect to said control valve.

7. In an unloader assembly as claimed in claim 5 and comprising a flexible shaft drivingly connected between said means responsive to the downstroke of the plow and said stepped cam shaft.

8. In an unloader assembly as claimed in claim 3 with said plow downstroke responsive means comprising a pinion, means responsive to the retracting of the plow to advance said pinion one tooth, and means drivingly connected between said pinion and said stepped cam so that said cam is advanced in conjunction with the stepwise advance of said pinion.

9. In an unloader assembly as claimed in claim 8 and comprising means responsive to the rotation of said pinion for indicating the rotation of said pinion through one revolution.

10. In an unloader assembly as claimed in claim 8 with said pinion advancing means comprising a hydraulic motor having a spring loaded pawl to move said pinion.

UNITED STATES PATENT OFFICE
CERTIFICATE OF CORRECTION

Patent No. 3,589,596  Dated June 29, 1971

Inventor(s) Frank O'Conor and John W. Sherlock

It is certified that error appears in the above-identified patent and that said Letters Patent are hereby corrected as shown below:

Column 1, line 3, "THE" should be --operation--;
Column 1, line 13, "the" first occurrence, should be -- then --
Column 1, line 37, "where in" should be --wherein--;
Column 1, line 66, "5-5" should be --4-4--;
Column 1, line 66, "FIG." should be --FIG. 1;--;
Column 1, after line 66, insert "FIG. 5 is a sectional view taken along the line 5-5 of FIG. 3;".

Signed and sealed this 11th day of January 1972.

(SEAL)
Attest:

EDWARD M. FLETCHER, JR.  ROBERT GOTTSCHALK
Attesting Officer  Acting Commissioner of Patents